(12) United States Patent
Mark et al.

(10) Patent No.: US 8,918,431 B2
(45) Date of Patent: Dec. 23, 2014

(54) ADAPTIVE ONTOLOGY

(75) Inventors: William Scott Mark, San Mateo, CA (US); Thierry Donneau-Golencer, Menlo Park, CA (US); Madhu Yarlagadda, Los Altos, CA (US)

(73) Assignee: SRI International, Menlo Park, CA (US)

( * ) Notice: Subject to any disclaimer, the term of this patent is extended or adjusted under 35 U.S.C. 154(b) by 475 days.

(21) Appl. No.: 13/229,591

(22) Filed: Sep. 9, 2011

(65) Prior Publication Data

US 2013/0066921 A1 Mar. 14, 2013

(51) Int. Cl.
*G06F 17/30* (2006.01)
(52) U.S. Cl.
CPC ............... *G06F 17/30734* (2013.01)
USPC ............................................. 707/794; 705/9
(58) Field of Classification Search
CPC .................... G06F 17/30616; G06F 17/30873; G06F 17/30011; G06F 17/30
USPC .......................... 707/705, 794, 802; 705/7.11
See application file for complete search history.

(56) References Cited

U.S. PATENT DOCUMENTS

| | | | | |
|---|---|---|---|---|
| 5,887,120 | A * | 3/1999 | Wical | 706/46 |
| 7,720,674 | B2 * | 5/2010 | Kaiser et al. | 704/9 |
| 2004/0024739 | A1 * | 2/2004 | Copperman et al. | 707/1 |
| 2005/0234738 | A1 * | 10/2005 | Hodes | 705/1 |
| 2007/0038500 | A1 * | 2/2007 | Hammitt et al. | 705/9 |

* cited by examiner

*Primary Examiner* — Monica Pyo
(74) *Attorney, Agent, or Firm* — Marger Johnson & McCollom PC (57) ABSTRACT

A computing system has a user interface allowing a user to view and input data related to concepts in a knowledge area associated with the user, an observation sub-system to centralize data and to identify a plurality of knowledge concepts, a conceptualization sub-system to generate a plurality of nodes within an ontological mapping, wherein each of the nodes corresponds to a certain one of the plurality of identified knowledge concepts identified by the observation sub-system, a relationship identification sub-system to create relationships between at least some of the plurality of identified knowledge concepts, and attribute affinity weights to the relationships, a change refinement sub-system to modify at least one of the plurality of nodes, affinity weights and relationships based upon information associated with the user, and a non-transitory knowledge store to store the information associated with the user pertaining to a sub-plurality of the plurality of identified knowledge concepts.

15 Claims, 11 Drawing Sheets

ADAPTIVE ONTOLOGY

BACKGROUND

A virtual personal assistant may consist of a computerized software program that helps a worker access, gather and analyze information to help the worker perform at a higher level. Virtual personal assistants for knowledge workers must have the ability to personalize, customize, and adapt to each specific user of the system. Knowledge workers operate in many different domains, each with its own jargon or terminology. In addition, each worker has his or her own version of that jargon. One solution may lie in the broad field of ontology. While ontologies apply in many different areas, they may provide a possible solution.

An ontology is a form of knowledge representation. Ontologies are frameworks for organizing information used in artificial intelligence, semantic web, systems engineering, software engineering, information architecture, information processing, virtual personal assistants, knowledge engineering and broadly in computer science as a form of representing knowledge. They typically consist of sets of concepts and relationships among those concepts for a particular domain. They are used to describe and understand the concepts of that domain. Artificial intelligence systems use ontologies to reason and extract knowledge.

Common components of an ontology include objects, instances, classes, attributes, relations, restrictions, rules, axioms and events. Objects are entities such as a person, a company, a name, etc. Instances are particular instances of an entity. Classes are collections of objects and entities. Attributes are properties and characteristics that an object or a class may have. Relations define how one class, object or entity relates to other classes, objects and entities. Restrictions define the constraints placed on classes, objects and entities. Rules define conditions and results such as those in if-then-else statements, logical inferences, etc. Axioms are logical assertions that define variables in the system, and events cause attributes, relations and axioms to change.

DETAILED DESCRIPTION OF THE EMBODIMENTS

The embodiments discussed here relate generally to data processing and more particularly, but not exclusively, to a system and method for learning new terminology and terminology relationships based on a user's behavior. Virtual personal assistants for knowledge workers must have the ability to personalize, customize, and adapt to each specific user of the system. The embodiments discussed here use a method and apparatus called "Adaptive Ontology" to create adaptable virtual personal assistants.

The present embodiments will be described more fully with references to the accompanying drawings, which show by way of illustration, specific exemplary embodiments by which the invention may be practiced. The embodiments may take many different forms and should not be construed as limited to the specific embodiments set forth here. Rather, those embodiments are provided so that this disclosure will be thorough and complete, and will fully convey the scope of the invention to those skilled in the art. Among other things, the embodiments are methods or devices. Accordingly, the present invention may take the form of an entirely hardware embodiment, an entirely software embodiment or an embodiment combining software and hardware aspects. The following detailed description should therefore not be taken in a limiting sense.

Briefly stated, the present embodiments include a system, method, and apparatus for adapting current knowledge based on user preferences as well as improving, changing, and/or modifying knowledge based on explicit and implicit user feedback, user data such as from user profiles, and preference learning.

In general, embodiments discussed here include a system, method and apparatus directed towards enabling a virtual personal assistant to adapt its ontology and hence improve its efficiency to service a user's query. Adaptive Ontology provides a method and mechanism for ontologies to adapt to users' terminology, usage patterns, preferences and priorities.

Adaptive Ontology enables the system to adapt its ontology so that new concepts and relationships can be developed or strengthened based on machine learning. It also enables the removal of concepts or weakening of relationship strength among concepts based on machine learning.

One of the main components of such a system involves a centralized controller, such as an Adaptive Ontology Controller. In one embodiment, a centralized controller may consist of a software logic module that implements Adaptive Ontology to enable a knowledge processing system to adapt its ontology based on an individual's terminology, usage patterns, preferences and priorities. The controller gathers new terms, usage, meanings, preferences and priorities through various observations including click stream data, implicit user behavior patterns, and explicit user indications.

The controller indexes these observations according to a set of pre-determined features that define the characteristics of observation data that are of interest for a particular knowledge processing system. It processes all such input and overlays the data over indexed, tagged and clustered data from a variety of data sources. The resulting process generates indicators that can be incorporated to a knowledge system. The outcome is a system that has innate ability to adapt to a user's needs, preferences, lingo and more.

Adaptive Ontology enables a virtual personal assistant to adapt to its user's needs just like a real assistant. Adaptive Ontology typically consist of five phases: concept identification; relationship identification; concept inclusion; concept exclusion; and concept and relationship personalization. The discussion will first provide an overview of the Adaptive Ontology system and the controller and will then provide a working example.

Concept identification specifies a new concept that needs to be added to the ontology map. An ontology map is a topological representation of objects in an ontology and how they relate to each other. The controller contains the logic that performs the discovery, then adapts the ontology and includes the new concept in a process referred to as adaptive ontology concept identification.

Figure 1:
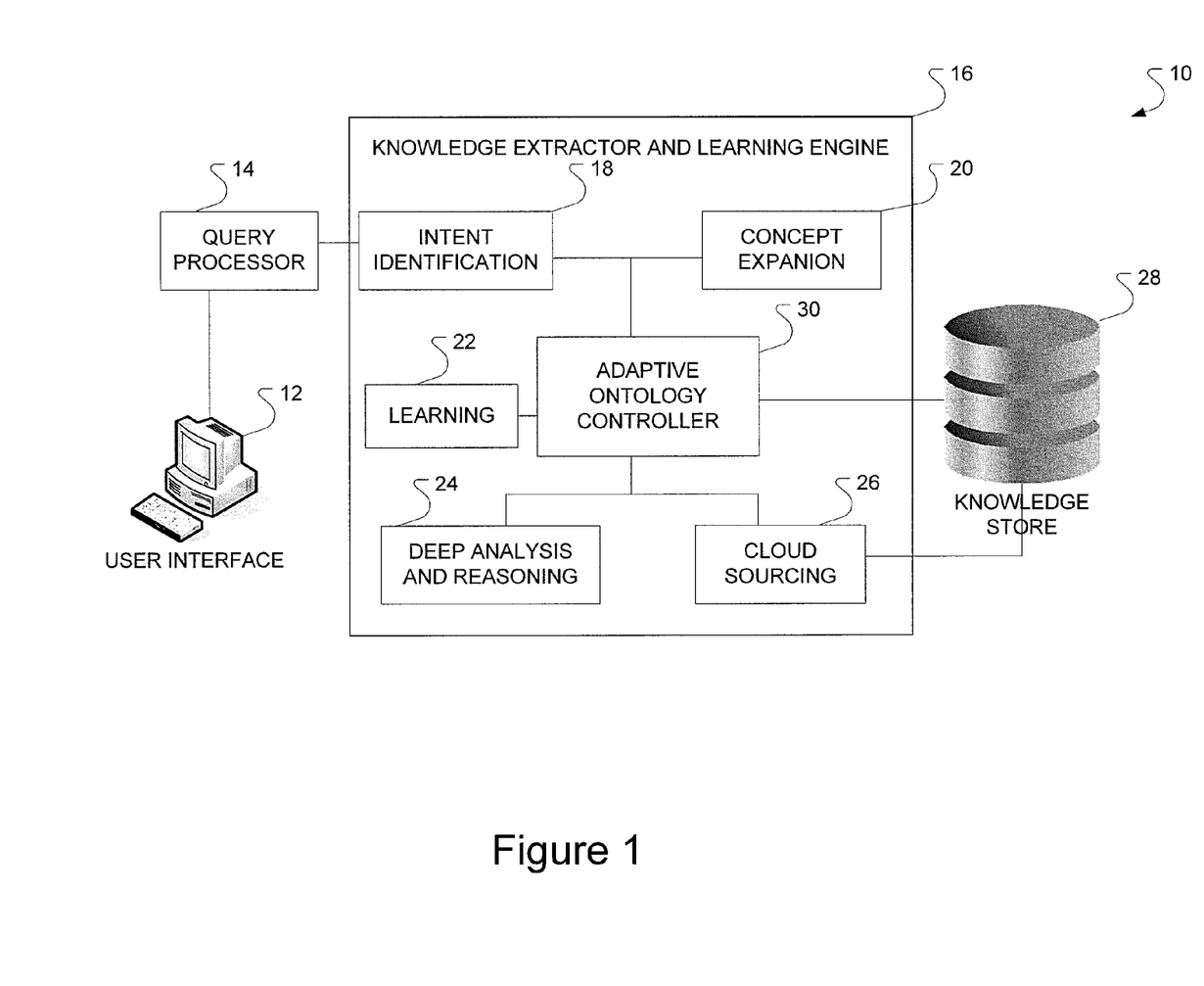
FIG. 1 shows an embodiment of an adaptive ontology system.

The query parser in FIG. 1 identifies a term used repeatedly by the user in queries where a type is usually expected. The deep analysis and reasoning module identifies important terms often referred to in the corpus but that do not appear in the ontology, then identifies important terms in questions found in the corpus. These terms are collected along with the context in which they appeared. Those whose frequencies attain a certain threshold are passed on to the next component that uses the context, user feedback, etc. to try to identify if they relate to existing concepts in the ontology, etc.

To perform relationship identification, the controller uses indexing, clustering, classification and frequency counts to identify relationships between newly discovered concepts and existing concepts. Using this information, the controller determines possible relationships between the newly discovered concept and the current ontology. An affinity index quantifies the strength of the relationship using concept occurrence frequency and co-concept occurrence frequency, which will be discussed in more detail later.

After determining the affinity index between the newly discovered concept and nodes in the ontology map, the controller will pick relationships with the greatest affinity index. It will then update the ontology to include the new concept in the process of concept inclusion. The controller continues an ongoing process of strengthening or weakening the affinity index for newly included concepts based upon user inputs such as query requests and click stream data.

In contrast, if the controller discovers from the user's inputs that the newly created concepts and its relationships are not used by the user, it will decrease the affinity index. If the process continues to a point where the affinity index falls under a certain threshold, the concept node in the ontology map becomes an orphan and will be pruned or excluded from the map in the process of concept exclusion.

The remaining phase is concept relationship and personalization. Concept nodes in the ontology may have associated parameters. Monitoring user inputs and data and based on user feedback, the controller can learn acceptable values and ranges for some parameters and adjust them over time.

Having discussed the overall foundations for an Adaptive Ontology system, the discussion now turns to FIG. 1 and an embodiment of the system architecture. A knowledge worker will interact with the system through a user interface 12. The user interface may consist of a computer or workstation, a personal digital assistant (PDA), a cell phone, a sales terminal, etc. The embodiments described here address the use of a virtual personal assistant in the sales area. While these embodiments center around the sales area, other areas of knowledge may use these concepts including management, legal, accounting, information technology, information security, education, etc.

The interactions with the system may take the form of queries or requests through the user interface 12. A query processor 14 will receive and process, parse or interpret the user inputs and provide them to a knowledge extractor and learning engine 16. The knowledge extractor and learning engine 16 may have several modules, among them the controller 30. The controller 30 interacts with the other modules in the engine including the intent identification module 18, the concept expansion module 20, the learning module 22, and the deep analysis and reasoning module 24. The engine 16 may also include a cloud sourcing module 26 that interacts with a knowledge store 28, as does the controller 30.

While FIG. 1 may imply that the user interface and query processor may reside on a separate machine or device than the engine 16 and the knowledge store 28, these elements may reside separately or together on a single device or several devices, or may exist in a distributed fashion across a cloud. For example, many of the discussions below will assume that the controller consists of a module of software code being executed by a processor, but it may also take the form of specialized hardware, etc.

Figure 2:
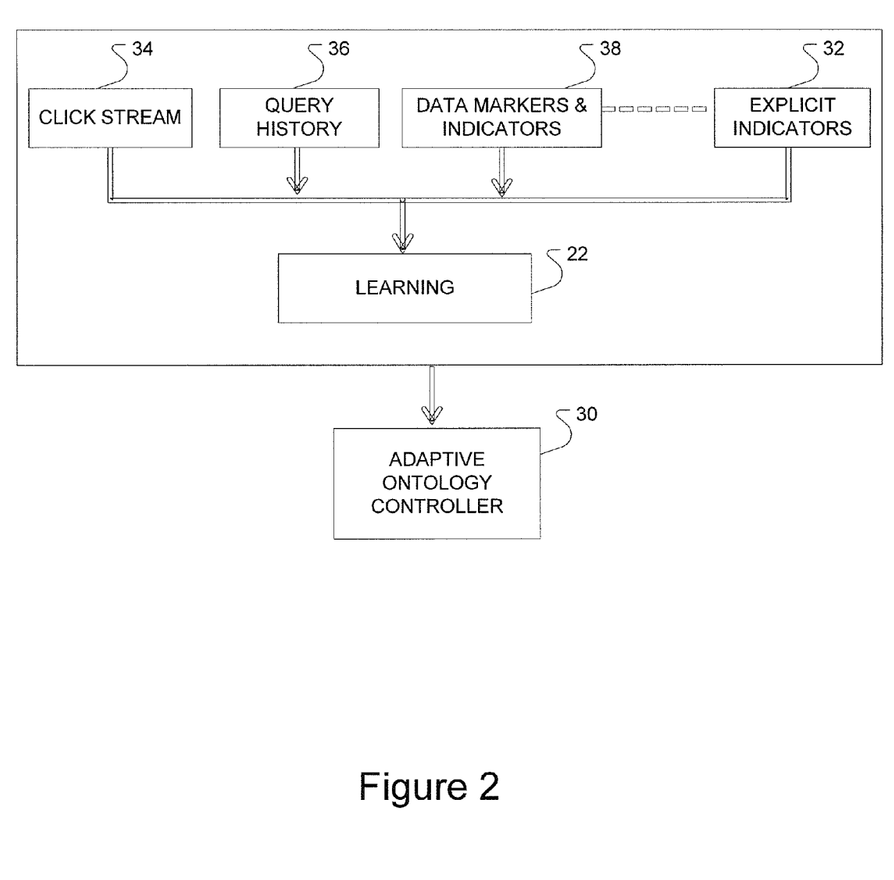
FIG. 2 shows an embodiment of inputs into the controller used for its learning.

Similarly, the user interface may not consist of a single interface. The user may interact with the system through many different portals and in many different manners. As mentioned above, the interactions with the user provide information to the system that allows the system to adapt and refine the ontology. FIG. 2 shows these interactions in more detail.

In FIG. 2, the learning module 22 receives as inputs user queries, where the user directly enters a query into the system. The query history 36 of a particular user allows the system to identify particular terms that may be unique to the user and customize ontology according. In addition, the user's 'click stream' or the history of selections made through a graphical user interface such as a web page by clicking on a particular selection, provides information as to not only the links selected, but also on a particular sequence of selections. In addition, the learning module uses data sources and markers 38 and explicit indicators 40. Other inputs may include implicit indicators, user profiles, user demographics, and even psychographic analysis of past behaviors. All of this information is used by the learning module to develop personalization of the ontology map for the controller 30.

Figure 3:
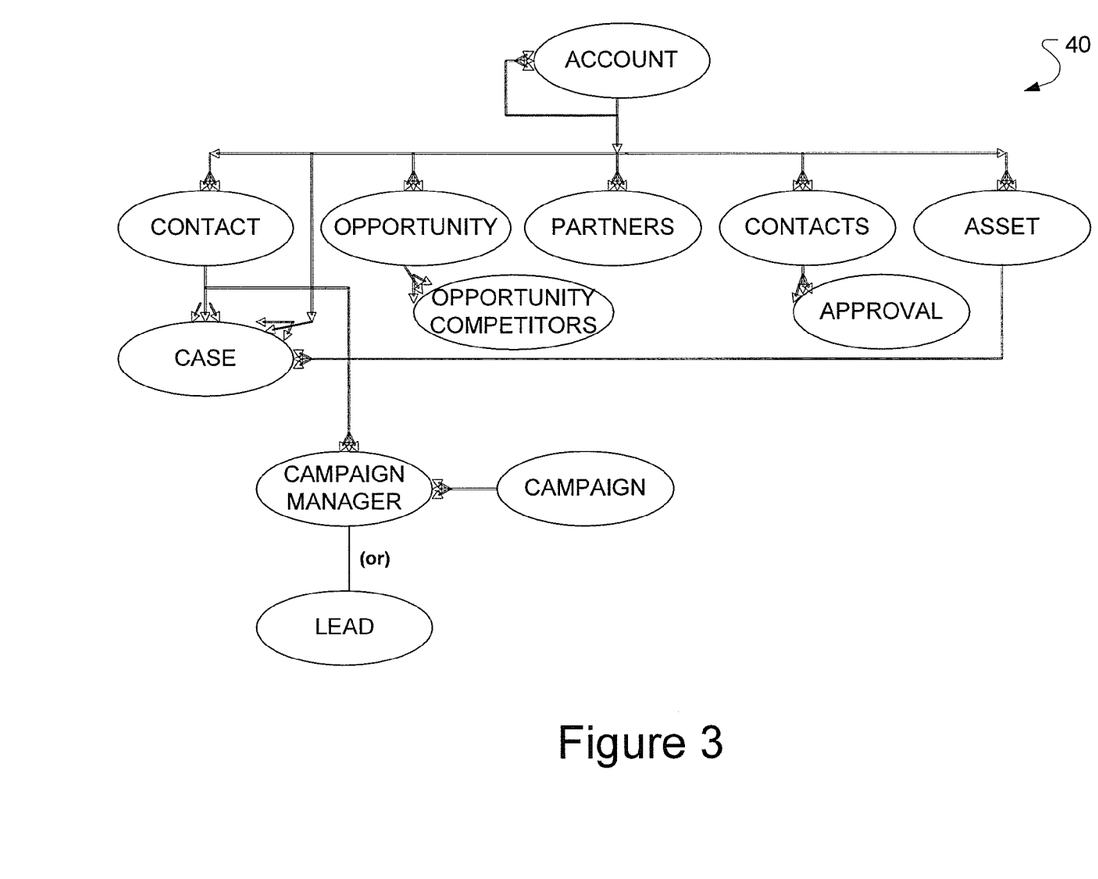
FIG. 3 shows an embodiment of a partial ontological map for a customer relationship management (CRM) account.

Turning now to a more specific example, FIG. 3 shows an example of an ontology map 40 of data related to a customer relationship management account in a sales environment. The account may have several objects associated with it, including contacts, opportunities, partners, contracts, approvals, assets, sales and marketing campaigns, leads, etc. This ontology may have been developed using the controller, or may have been developed by explicit entry of data known about the particular account.

It should be noted that other types of objects may be associated with the account, such as place. Objects could be expanded to include other entities, such as expanding a place object to include not just countries, but cities or regions within countries.

Figure 4:
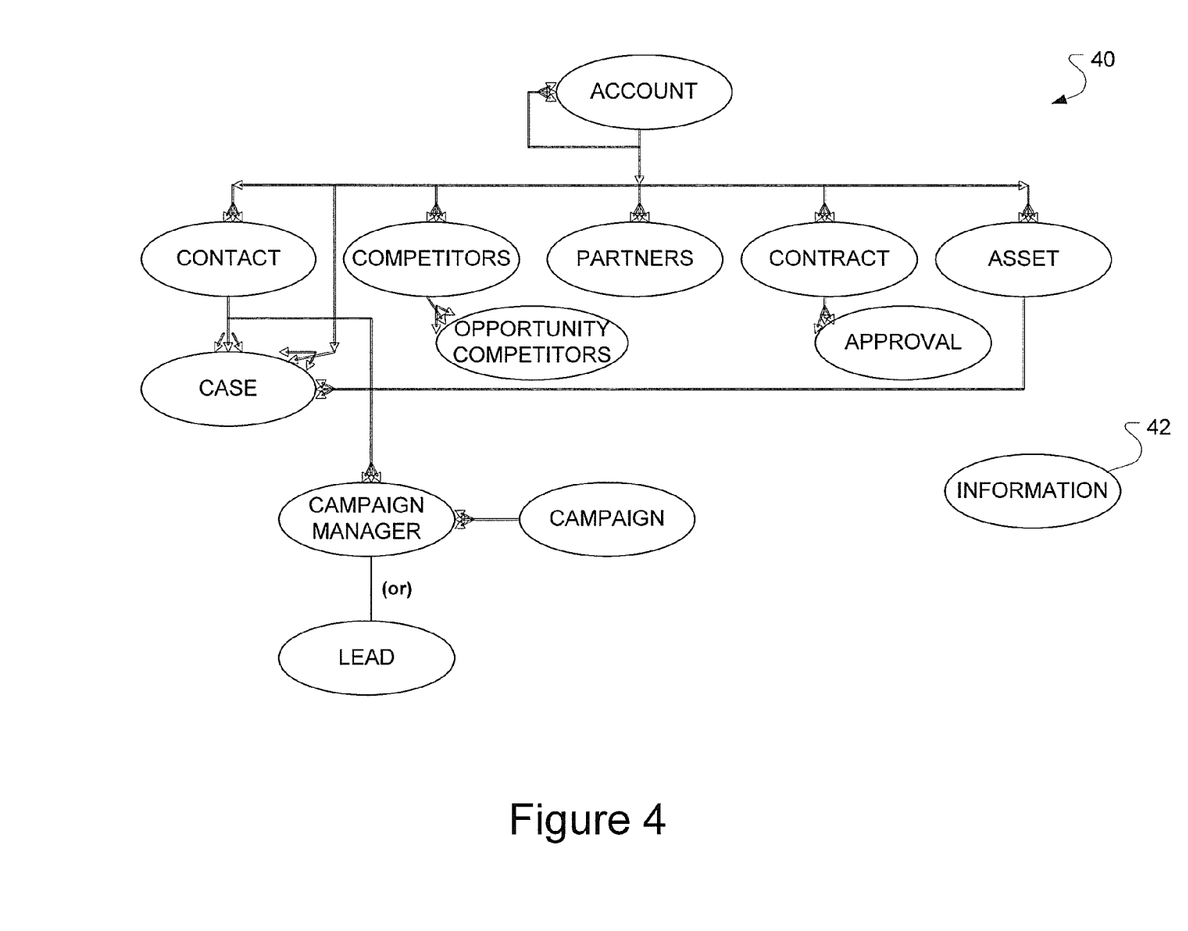
FIG. 4 shows an embodiment of a partial ontological map for a CRM account receiving new information.

A user, such as a salesperson, would then query the system, such as "Get XYZ Sales Information." The virtual personal assistant receives the query through a user interface. The query processor breaks the query into its component parts. The controller then infers that "Get" is a command and "XYZ" is a company, a person or some other entity. Analysis of past data results in identifying XYZ as a company. The controller has no information in the existing ontology for "Sales" or "Information." The process of concept identification specifies that these are new concepts. FIG. 4 shows that the controller has established a node 42 for the new concept of "Information."

In addition to the interaction with the users through user inputs, the controller constantly mines relationships without user interaction. As more information enters the system about various aspects of the relationships, the relationship information and linkages will be updated. In addition, the user's click stream, the stream of inputs from the user's interaction with the system, can be observed and processed to update further information about the user.

Figure 5:
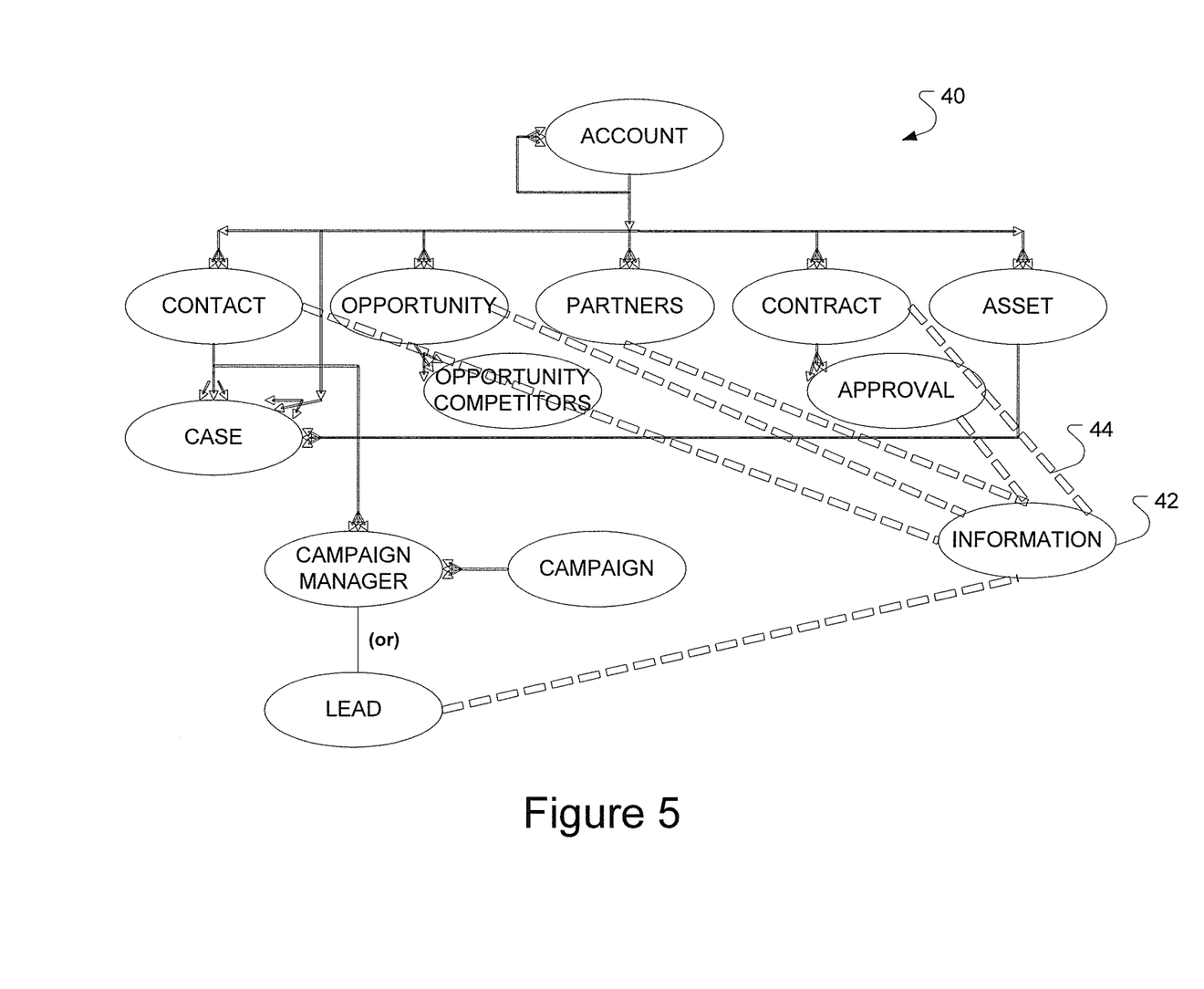
FIG. 5 shows an embodiment of a partial ontological map for a CRM account after building links to new information.
Figure 6:
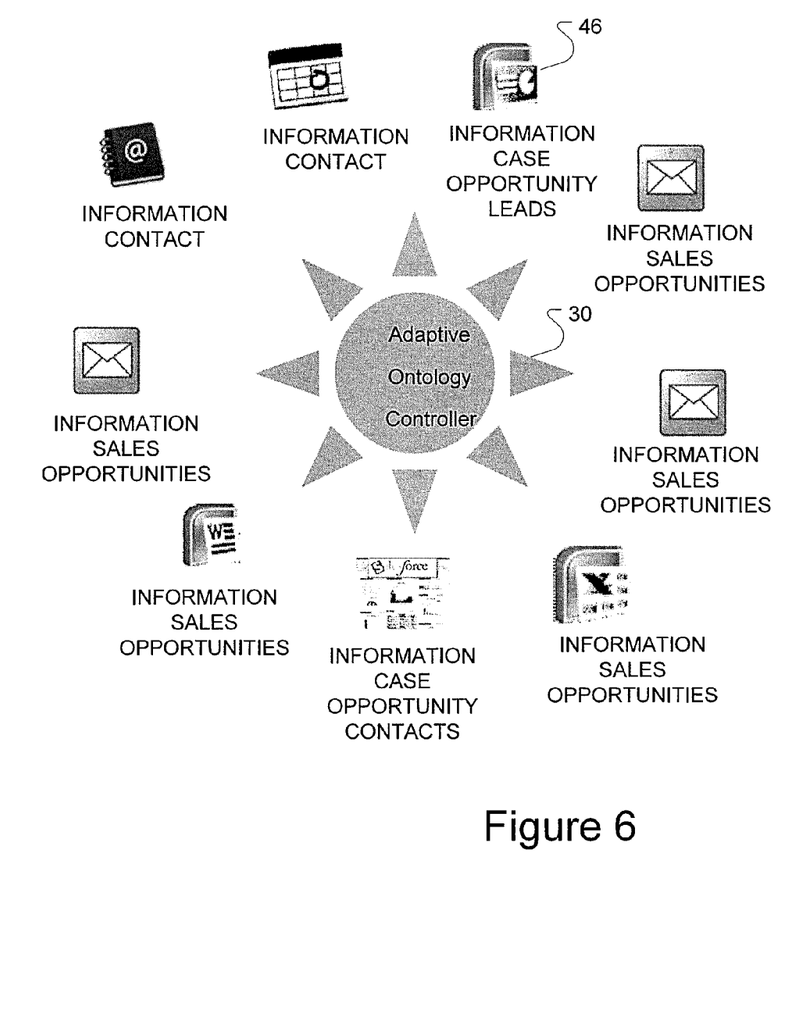
FIG. 6 shows an embodiment of an extension of an ontological map.

The controller moves on to Relationship Identification to identify relationships between this new node and already existing concepts in the Ontology. FIG. 5 shows identification of several possible relationships identified by the dotted line 44. These possible relationships in this particular embodiment result from reference counts against all of the other nodes. FIG. 6 shows such a mapping. Using the relationships identified through the mapping, such as relationship 46 that connects "Information" with "Case," "Opportunities," and "Leads," the following tables show the reference counts for the terms "Information" and "Sales."

| Key Object | Clustered Object | Count |
|---|---|---|
| Information | Sales | 6 |
| Information | Opportunities | 7 |
| Information | Case | 1 |
| Information | Leads | 1 |
| Information | Contact | 3 |

| Key Object | Clustered Object | Count |
|---|---|---|
| Sales | Information | 6 |
| Sales | Opportunities | 6 |
| Sales | Case | 0 |
| Sales | Leads | 0 |
| Sales | Contact | 1 |

From this, one can see that Information and Opportunities have the highest affinity count at 7 and Information and Sales have the next highest affinity count at 6. Information and Contact, Case and Leads have affinity counts of 3, 1 and 1, respectively. This indicates a strong co-relation between Information and Opportunities and Information and Sales.

This process may then repeat by iterating on the Key Object to any desired depth or dimension. In experiments, a depth of three gave sufficient accuracy. The iterations on Key Object are shown in the below tables, as an example. Note that these are examples and the figure does not include all of the concepts shown in the below tables.

| Key Object | Clustered Object | Count |
|---|---|---|
| Opportunities | Sales | 6 |
| Opportunities | Information | 7 |
| Opportunities | Case | 1 |
| Opportunities | Leads | 1 |
| Opportunities | Contact | 1 |

| Key Object | Clustered Object | Count |
|---|---|---|
| Contact | Sales | 1 |
| Contact | Opportunities | 1 |
| Contact | Case | 0 |
| Contact | Leads | 0 |
| Contact | Information | 2 |

| Key Object | Clustered Object | Count |
|---|---|---|
| Leads | Sales | N |
| Leads | Information | N |
| Leads | Case | N |
| Leads | Opportunities | N |
| Leads | Contact | N |

| Key Object | Clustered Object | Count |
|---|---|---|
| Case | Sales | n |
| Case | Opportunities | n |
| Case | Contact | n |
| Case | Leads | n |
| Case | Information | n |

Figure 7:
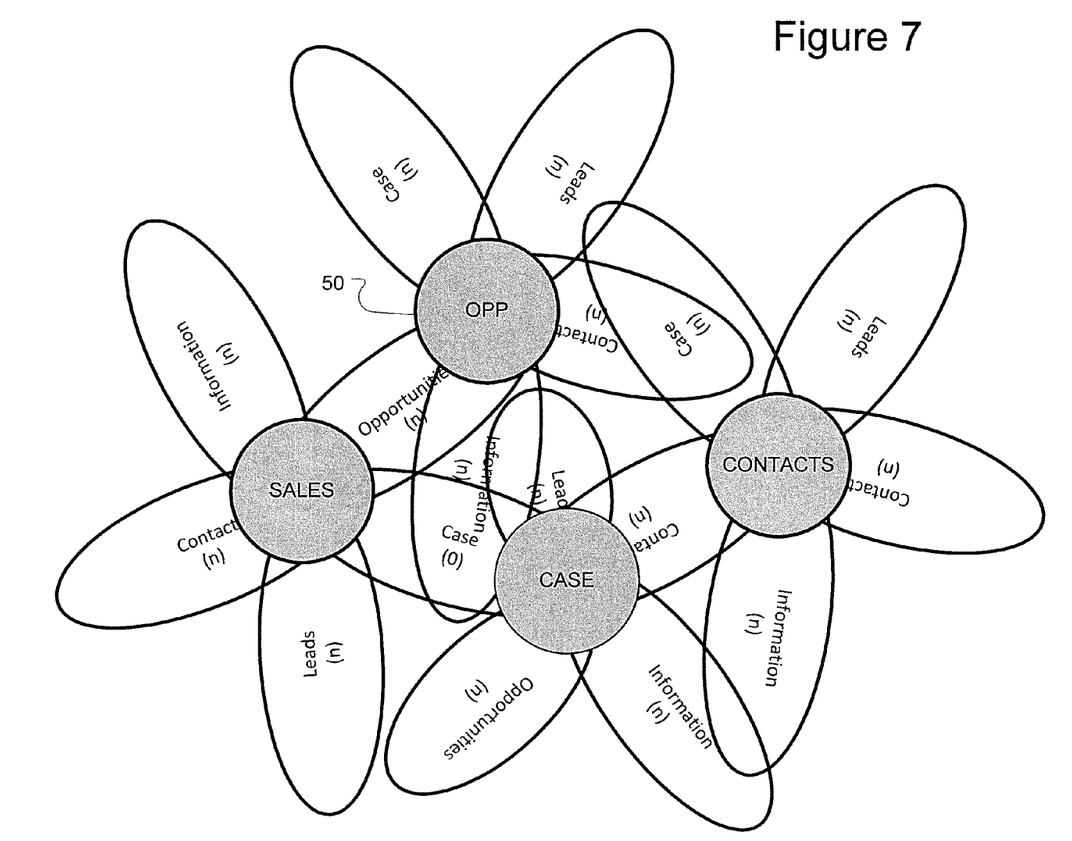
FIG. 7 shows an embodiment of a clustering process performed by a controller.
Figure 8:
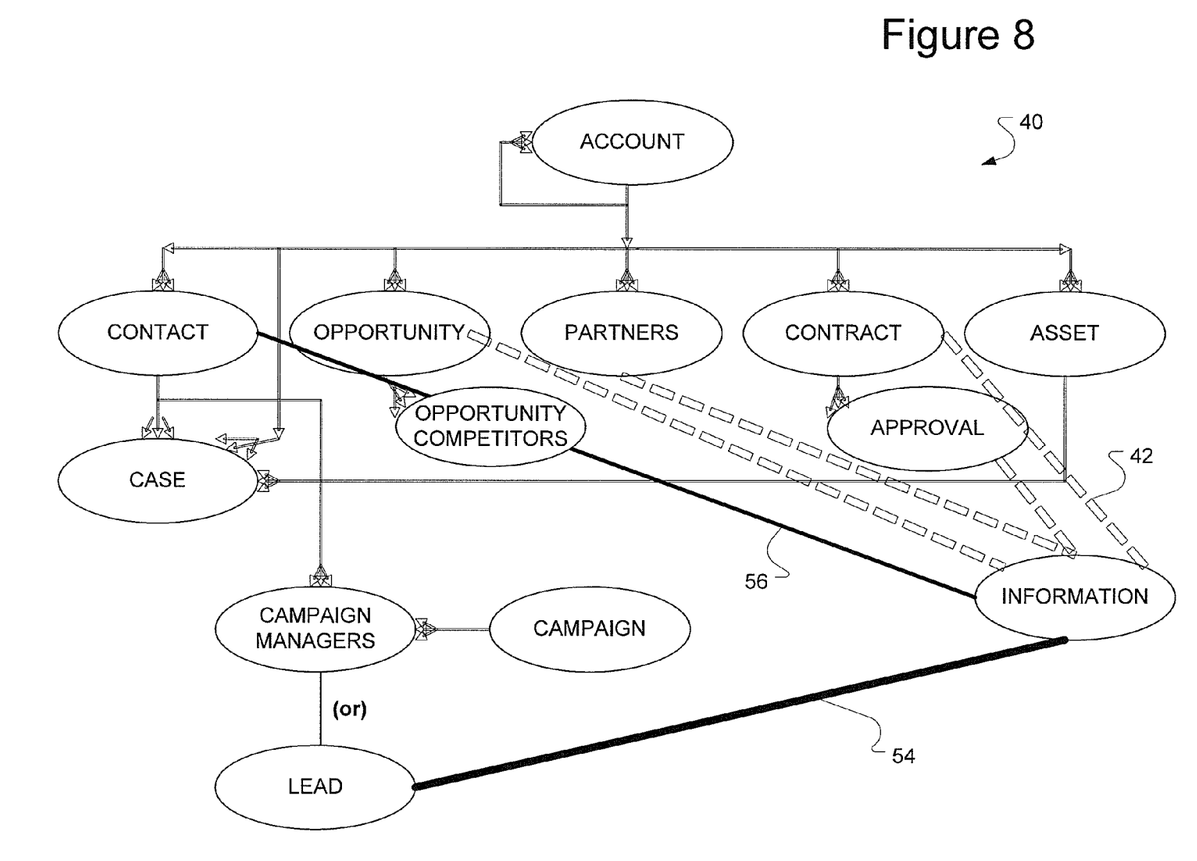
FIG. 8 shows an embodiment of a partial ontological map having strong and weak associations.

FIG. 7 shows a graphical representation of clustering of the concepts. The cluster OPP, or Opportunities 50, comes from the table above in which Opportunity is the Key Object. FIG. 8 shows the relationships chosen from among the possibilities for the ontology map 40. The thickness of the line indicates the affinity of the relationship. The relationship between Information and Lead 54, for example, has a stronger affinity than the relationship between Information and Contact 56.

The affinity index can be calculated in many different ways. It is a function of concept occurrence frequency and co-concept occurrence frequency as shown by:

$$ai = f\{f'(of), f''(cof)\},$$

where ai is the Adaptive Ontology Concept Affinity Index, of=Concept Occurrence Frequency, cof=Co-Concept Occurrence Frequency. Concept affinity index (ai) is the strength of the relationship between the new concept and existing concepts in the ontology. A higher ai means a greater affinity between the new concept and existing co-concept nodes, where co-concept nodes are existing concepts in the ontology.

In the embodiments discussed above, the affinity index is calculated using the frequency count. The higher the frequency count, the higher the affinity index between two concepts. Other methods of calculating the affinity index include in-depth analysis of text corpus, documents and structured database schemas. Standard techniques like clustering, co-occurrence counts, and frequency counts can be used as well.

One further refinement can be made with regard to frequency count. Using techniques such as latent semantic analysis, common words among a set of documents or other segments of information, can have the importance of their frequency reduced. This reduction is based upon their commonality among all of the documents. For example, a set of documents or segments of information related to sales may have a very high frequency count of the phrase 'sales forecasts' because the documents all relate to sales. Therefore, the significance of that term having a high frequency count is reduced to account for the commonality of that phrase.

As mentioned above, after the controller selects the relationship it will update the ontology map, such as shown in FIG. 8, to reflect the new relationship. This is the process of Concept Inclusion. The controller will then monitor the user's inputs, such as queries and click stream analysis. The controller uses these inputs to strengthen or weaken the affinity index for newly included concepts. As part of Concept Exclusion, the controller may decrease the affinity index if the new relationship is not used by the user. If the affinity falls below a certain threshold, the controller excludes the concept from the ontology map automatically.

Figure 9:
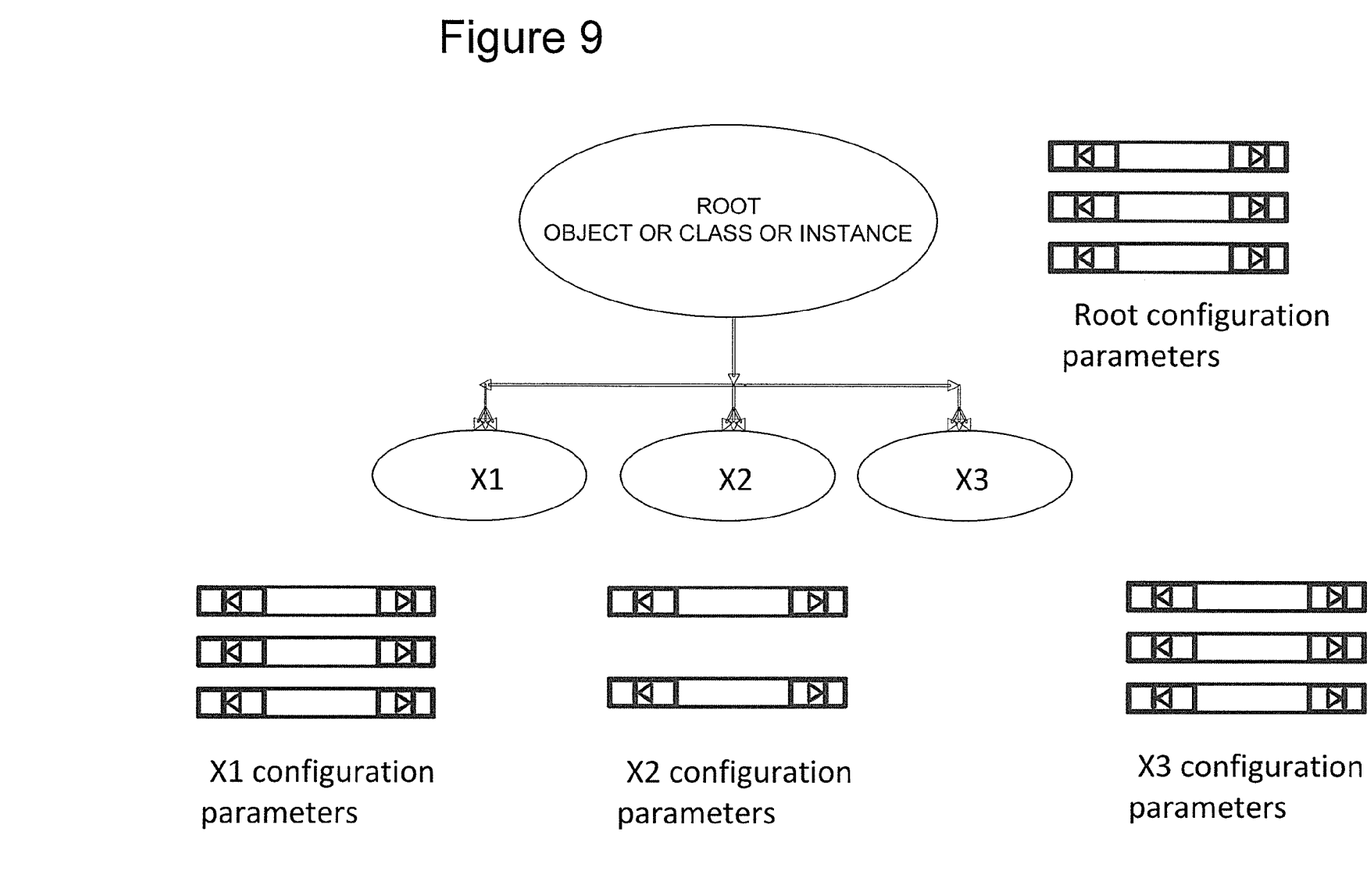
FIG. 9 shows an embodiment of an ontological relationship between objects.

In addition to the ability to add, remove and update relationships between concepts, the controller has the ability to customize the range of parameters for each of the concept nodes in the ontology. FIG. 9 shows an ontological relationship between objects Root and X1, X2 and X3. Each of these objects has configuration parameters. The controller customizes and personalizes each of the parameters based upon the flow of knowledge shown in FIG. 1. The controller knows the range of each of these parameters and tunes them for each and every user of the system, resulting in a highly customized and personalized knowledge engine that acts and reacts similar to a human assistant. The personalized parameter values, conditions and triggers are stored in a user profile.

As an example, the controller monitors users query requests and response click stream. Based on this interaction it creates or lowers the range for each of the key parameters. The controller can figure out that the sales close date for a particular organization is the 5th of every month based on analyzed data. Subject to this observed behavior occurring, controller will set "close date", a configuration parameter for the "Sales" concept such as X1, to "$5^{th}$". Using these parameters, the controller can automatically generate sales reports on the $5^{th}$ of every month and present them to the user without user ever asking for it.

The controller may consist of subsystems. For example, in the embodiment of FIG. 10, the controller has an observation subsystem, a conceptualization subsystem, a relationship identification subsystem and a change refinement subsystem. The observation subsystem 60 centralizes all of the data it gathers from the learning process of FIG. 2. The observation subsystem derives themes, patterns, preferences, expectations, meanings and intent.

Figure 10:
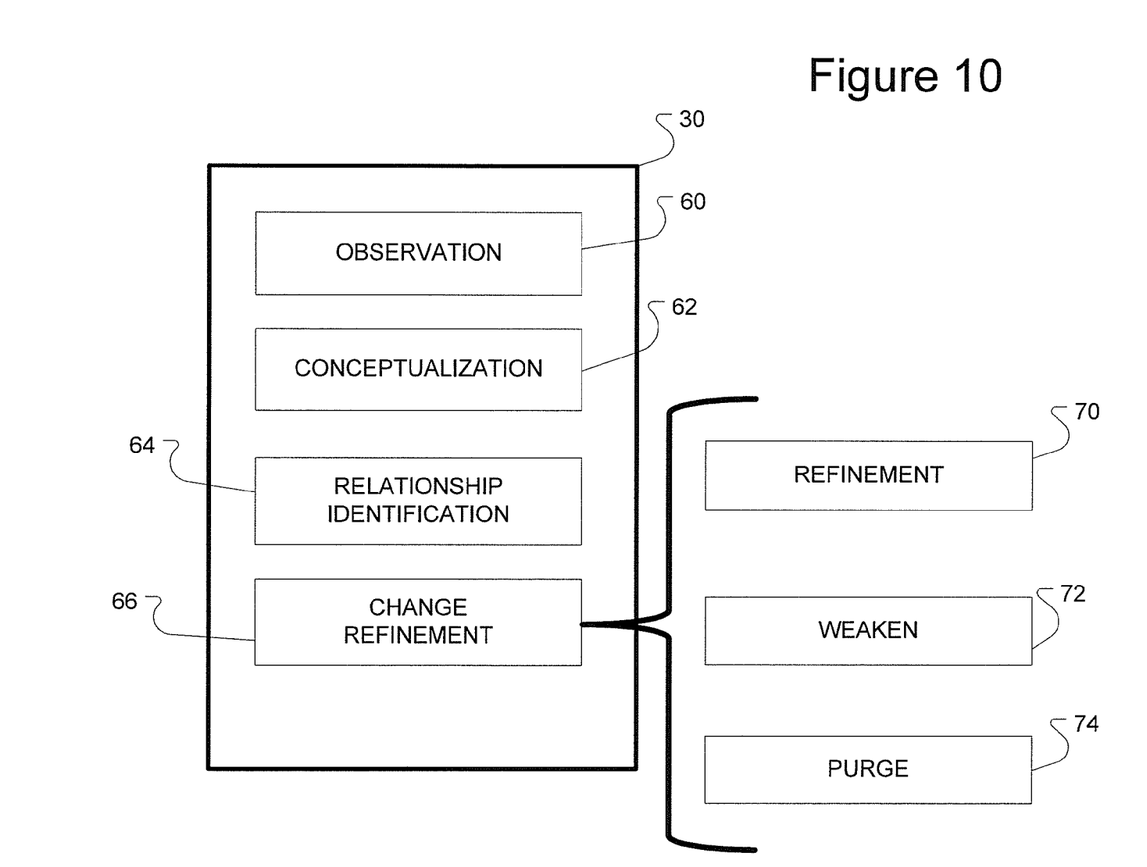
FIG. 10 shows an embodiment of a controller.

The conceptualization subsystem takes the identified patterns from the observation subsystem and creates key concepts. It expands the concepts and identifies all the sub concepts and their relationships to the main concept. It orders the sub concepts based on users preferences obtained from the learning process.

The relationship identification subsystem creates relationships, bonds, affinity weights across key objects in the ontology based on the observation and conceptualization subsystem analyses. The change refinement subsystem refines the bonds and affinity weights created by the relationship identification subsystem by strengthening them 70, weakening them 72, or purging them 74.

Figure 11:
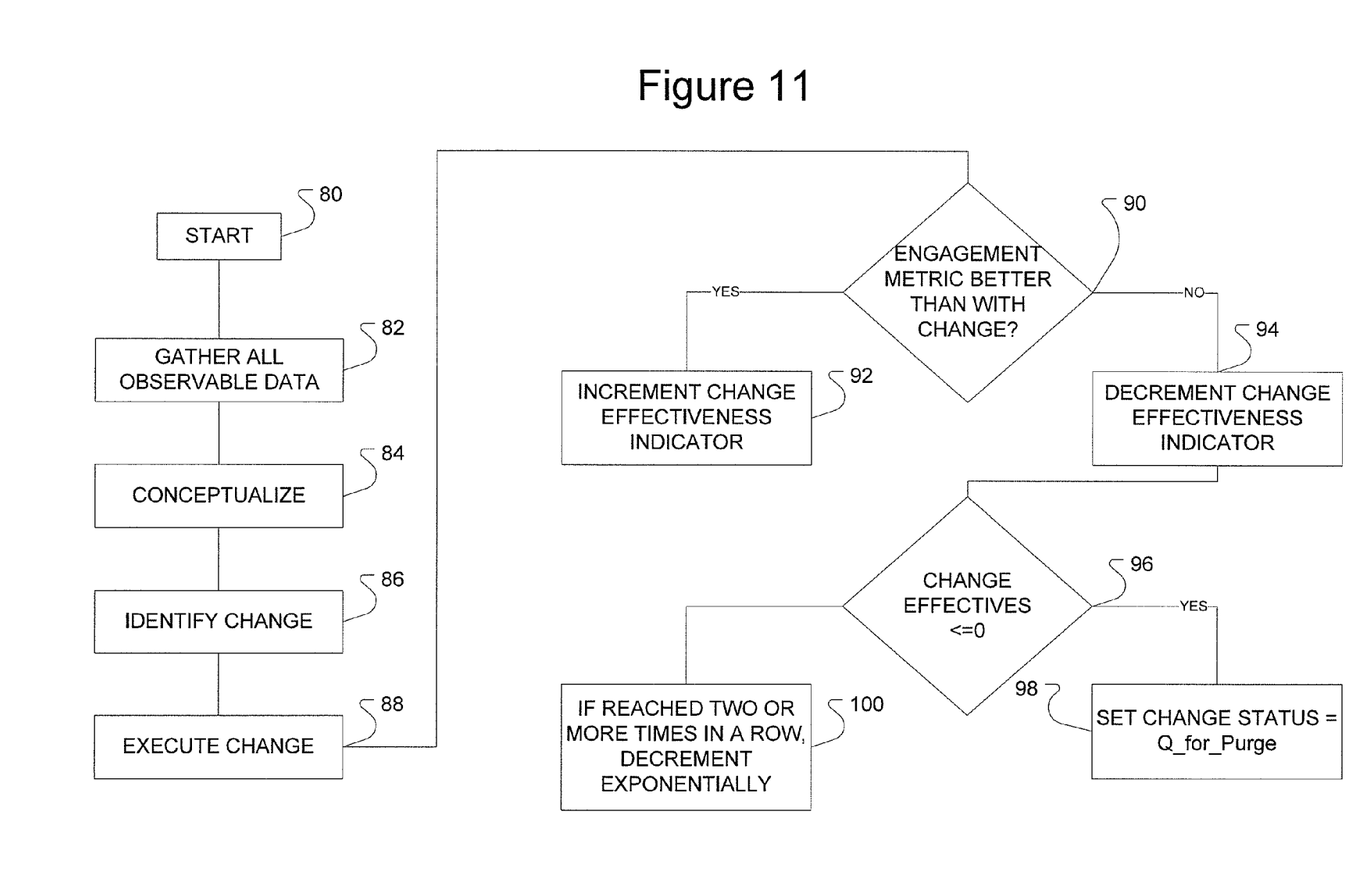
FIG. 11 shows and embodiment of a process for identifying and changing ontological references.

FIG. 11 shows a flowchart of one embodiment of a process of updating and changing ontological references using the controller starting at 80. At 82, the controller gathers all observable data, such as query history, click stream data, data from personal sources such as email, contacts, accounts, leads, etc. At 84, this data is then analyzed and conceptualized. This may include identifying recursive patterns, meaning and intent based upon corrections and click stream data, preferences through explicit or implicit indicators, and identifying lingo, usage and concept synonyms.

Changes are identified at 86 by identifying new objects, identifying relationships between subsystem objects and existing objects. Once the change has been identified, such as updating the relationship on the ontological map, the change is executed at 88.

At 90, the change is tested to see if the user engages more or less with the new relationship. If yes, the change effectiveness indicator is incremented at 92, strengthening the relationship. If no, the change effectiveness indicator is decremented at 94. If the change effectiveness is greater than or equal to zero at 96, the new change or concept is purged from the system. If the answer at 96 is no, and that result has been reached more than twice in a row, the change effectiveness indicator is decremented exponentially. This process demonstrates how the controller generally acts rapidly to correct errors.

In this manner, an adaptive ontology provides a learning system that customizes itself in an automated fashion for a particular user. It allows users to access data easily without the constraints of using a particular vocabulary or terminology.

Thus, although there has been described to this point a particular embodiment for a method and apparatus for an Adaptive Ontology, it is not intended that such specific references be considered as limitations upon the scope of this invention except in-so-far as set forth in the following claims.

What is claimed is:

1. A computing system including at least one processor, the system comprises:
   a user interface to allow a user to view and input data related to sales associated with the user;
   an observation sub-system having a processor configured to centralize data and to identify each of a plurality of sales concepts;
   a conceptualization sub-system configured to generate a plurality of nodes within an ontological mapping, wherein each of the plurality of nodes corresponds to a certain one of the plurality of identified sales concepts identified by the observation sub-system, the conceptualization sub-system configured to generate new nodes within the ontological mapping responsive to a determination that a new concept exists in the system;
   a relationship identification sub-system configured to create relationships between at least some of the plurality of identified sales concepts, and attribute affinity weights to the relationships, wherein the affinity weight quantifies a strength of the relationship between the sales concepts using concept occurrence and co-concept occurrence, and each concept occupies a node on the ontological mapping, the relationship identification sub-system to select relationships between the nodes with the greatest affinity index and then update the ontology to with the affinity index for the selected relationships;
   a change refinement sub-system configured to modify at least one of the plurality of nodes, affinity weights and relationships based upon information associated with the user; and
   a non-transitory knowledge store configured to the information associated with the user pertaining to a sub-plurality of the plurality of identified sales concepts.

2. The system of claim 1, wherein the information associated with the user comprises at least one of a user profile, user inputs, and user interaction data.

3. The system of claim 1, wherein the conceptualization sub-system comprises:
   a node inclusion module configured to generate a new node within the ontological mapping responsive to a determination that a new concept exists in the system.

4. The system of claim 1, wherein the change refinement sub-system comprises:
   a removal module configured to remove a certain one of the plurality of nodes responsive to a determination that a certain affinity index pertaining an identified sales concept corresponding to the certain node has dropped below a predetermined threshold.

5. The system of claim 1, wherein each of the plurality of identified sales concepts comprises one of a group consisting of: sales contacts, sales cases, sales opportunities, sales partners, sales contracts, and assets.

6. The system of claim 4, wherein the group further consists of: sales campaigns, campaign managers, sales leads, sales opportunity competitors, and sales contract approvals.

7. The system of claim 1, wherein the relationship identification sub-system is configured to define the relationships based at least in part on indexing of at least some of the plurality of identified sales concepts.

8. The system of claim 1, wherein the relationship identification sub-system is configured to define the relationships based at least in part on classifications corresponding to at least some of the plurality of identified sales concepts.

9. The system of claim 1, wherein the relationship identification sub-system is configured to define the relationships by determining frequency counts corresponding to at least some of the plurality of identified concepts.

10. The system of claim 1, wherein the observation sub-system is configured to identify each of the plurality of sales concepts by analyzing a query.

11. The system of claim 1, wherein the observation sub-system is configured to identify each of the plurality of sales concepts by analyzing click stream data.

12. The system of claim 1, wherein the relationship identification sub-system is configured to determine the affinity weight based on an occurrence frequency of at least one identified sales concept pertaining to the at least one of the defined relationships.

13. The system of claim 1, the relationship identification sub-system further comprising a cluster generation module configured to generate at least one cluster based on a sub-plurality of the plurality of identified sales concepts and at least one defined relationship.

14. The system of claim 1, wherein the relationship identification module is further configured to modify the at least one generated cluster.

15. A computing system including at least one processor, the system comprises:

a user interface to allow a user to view and input data related to concepts in a knowledge area associated with the user;

an observation sub-system having a processor configured to centralize data and to identify each of a plurality of knowledge concepts;

a conceptualization sub-system configured to generate a plurality of nodes within an ontological mapping, wherein each of the plurality of nodes corresponds to a certain one of the plurality of identified knowledge concepts identified by the observation sub-system, the conceptualization sub-system configured to generate new nodes within the ontological mapping responsive to a determination that a new concept exists in the system;

a relationship identification sub-system configured to create relationships between at least some of the plurality of identified knowledge concepts, and attribute affinity weights to the relationships, wherein the affinity weights quantify a strength of the relationship between the identified knowledge concepts using concept occurrence and co-concept occurrence, and each concept occupies a node on the ontological mapping, the relationship identification sub-system to select relationships between the nodes with the greatest affinity index and then update the ontology to with the affinity index for the selected relationships;

a change refinement sub-system configured to modify at least one of the plurality of nodes, affinity weights and relationships based upon information associated with the user; and a non-transitory knowledge store configured to the information associated with the user pertaining to a sub-plurality of the plurality of identified knowledge concepts.

* * * * *